United States Patent [19]

Ogawa

[11] 4,428,482
[45] Jan. 31, 1984

[54] STORAGE CASE FOR A CASSETTE

[75] Inventor: Kimio Ogawa, Yokohama, Japan

[73] Assignee: Victor Company of Japan, Limited, Yokohama, Japan

[21] Appl. No.: 409,896

[22] Filed: Aug. 20, 1982

[30] Foreign Application Priority Data

| Aug. 21, 1981 | [JP] | Japan | 56-122946[U] |
| Aug. 21, 1981 | [JP] | Japan | 56-122947[U] |
| Aug. 21, 1981 | [JP] | Japan | 56-122948[U] |
| Aug. 21, 1981 | [JP] | Japan | 56-122949[U] |
| Aug. 21, 1981 | [JP] | Japan | 56-130140 |

[51] Int. Cl.³ ............................................. B65D 85/672
[52] U.S. Cl. ...................................... 206/387; 220/335; 220/340; 206/493
[58] Field of Search ................ 206/387, 493; 270/335, 270/334, 338, 340

[56] References Cited

U.S. PATENT DOCUMENTS

| 3,978,985 | 9/1976 | Zinbauer | 206/387 |
| 4,211,337 | 7/1980 | Weavers et al. | 206/387 |
| 4,253,568 | 3/1981 | Long et al. | 206/387 |

Primary Examiner—Joseph Man-Fu Moy
Attorney, Agent, or Firm—Lowe, King, Price & Becker

[57] ABSTRACT

A storage case for a cassette such as video tape cassette includes a base having a bottom, a rear wall and a pair of side walls, and a cover pivotably mounted on the base and having a top, a front wall and a pair of side walls. The cover is angularly movable with respect to the base between open and closed positions. A cylindrical projection is mounted on the bottom and located more closely to one of the side walls of the base than to the other for being inserted into a hole in a supply reel of the cassette when the latter is placed in the storage case. The cylindrical projection has a plurality of locking fins which can be fitted in grooves in an inner wall defining the hole in the supply reel of the cassette. Accordingly, the supply reel is locked by the cylindrical projection and its locking fins against accidental rotation and hence loosening of a magnetic tape wound around the supply tape. The other side wall of the base has a pair of tapered vertical ridges which serve as a takeup reel stopper when they mesh with teeth defined on a flange of a takeup reel of the cassette.

17 Claims, 12 Drawing Figures

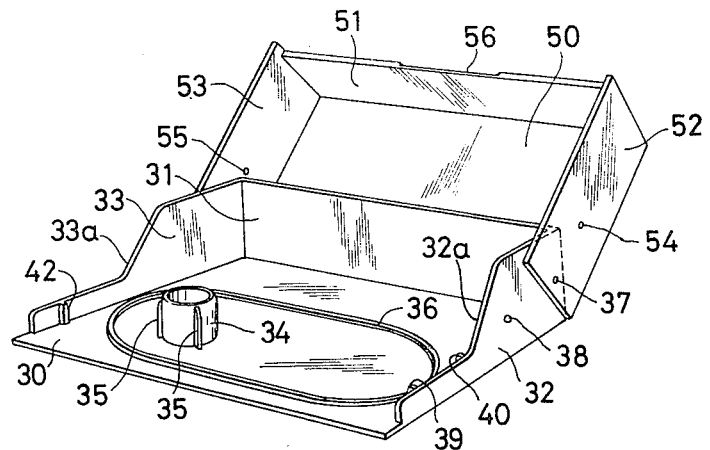
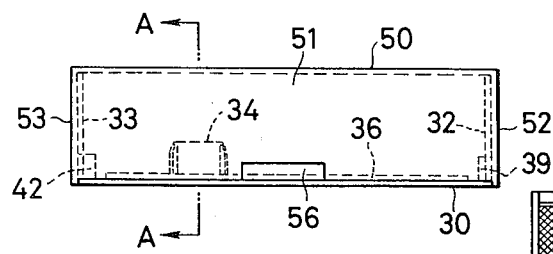
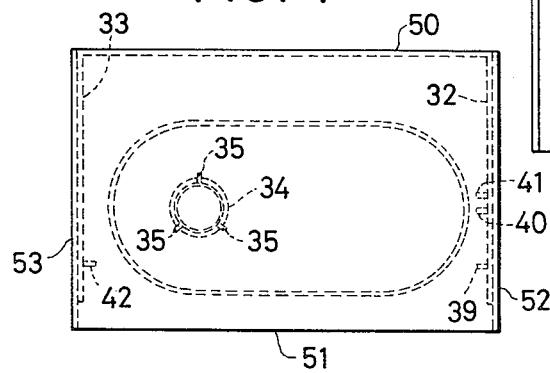
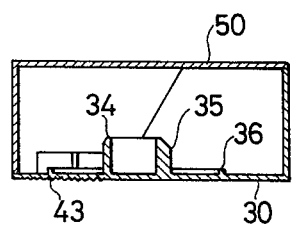

STORAGE CASE FOR A CASSETTE

BACKGROUND OF THE INVENTION

The present invention relates to a storage case for storing a cassette composed of a package or container having therein a pair of reels of continuous magnetic tape.

SUMMARY OF THE INVENTION

It is an object of the present invention to provide a storage case for storing a cassette therein.

Another object of the present invention is to provide a cassette storage case having means for locking cassette supply and takeup reels to prevent accidental rotation thereof and undesirable loosening of a magnetic tape wound onto the reels.

Still another object of the present invention is to provide a storage case into and out of which a cassette can be taken easily and smoothly.

Still another object of the present invention is to provide a cassette storage case having means for spacing the lower face of a cassette supply reel from a bottom of the cassette storage case so that the supply reel can be resiliently and stably urged against a container of the cassette to prevent undesired rotation.

According to the present invention, a storage case for a cassette such as a video tape cassette comprises a base having a bottom, a rear wall and a pair of spaced side walls, and a cover having a top, a front wall and a pair of spaced side walls and pivotably mounted on the base for angular movement between open and closed positions with respect to the base. A cylindrical projection is mounted on the bottom of the base and located more closely to one of the side walls of the base than to the other. When the cassette is placed in the storage case, the cylindrical projection is inserted in a hole in a supply reel of the cassette to position the supply reel. The cylindrical projection has a plurality of angularly spaced locking fins which can be fitted in grooves in an inner wall defining the hole in the supply reel to lock the supply reel against accidental rotation and hence unwanted loosening of a magnetic tape wound on the supply reel. The locking fins have tapered ends remote from the bottom of the base for smooth insertion into the grooves. The side walls of the base have recesses opening toward a front edge of the base so that the cassette can easily and smoothly be taken into or out of the storage case. The bottom of the base has a continuous or interrupted ridge for engaging the cassette as placed in the storage case to keep a projecting lower face of the supply reel spaced from the bottom of the base. Such an arrangement permits the supply reel to be held resiliently against a container of the cassette under the force of a resilient means in the cassette container stably against unwanted rotation of the supply reel. The side walls of the base also have a pair of vertical ridges insertable respectively in a pair of opposite slots in the container of the cassette when the latter is stored in the storage case, for thereby locking the cassette in the storage case against wobbling movement of the cassette. The other side wall has a pair of ridges which serve as a takeup reel stopper when they mesh with teeth on a flange of a takeup reel of the cassette. Therefore, when the cassette is put in the storage case, the takeup reel is prevented by the takeup reel stopper from being accidentally rotated and hence the magnetic tape is protected from unwanted loosening off the takeup reel.

With the arrangement of the storage case, the base has no front wall opposite to the rear wall thus allowing the cassette to be taken into or out of the storage case quite easily and smoothly. As there is no front wall on the base, the storage case of the present invention is made of a minimum number of parts, and accordingly can be constructed less costly.

BRIEF DESCRIPTION OF THE DRAWINGS

The present invention will be described in detail by way of illustrative example with reference to the accompanying drawings, in which;

FIG. 5 is a perspective view of a storage case according to an embodiment of the present invention;

FIG. 6 is a front elevational view of the storage case illustrated in FIG. 5;

FIG. 7 is a plan view of the storage case of FIG. 5;

FIG. 8 is a bottom view of the storage case of FIG. 5;

FIG. 9 is a cross-sectional view taken along line A—A of FIG. 6;

DETAILED DESCRIPTION

Figure 1:
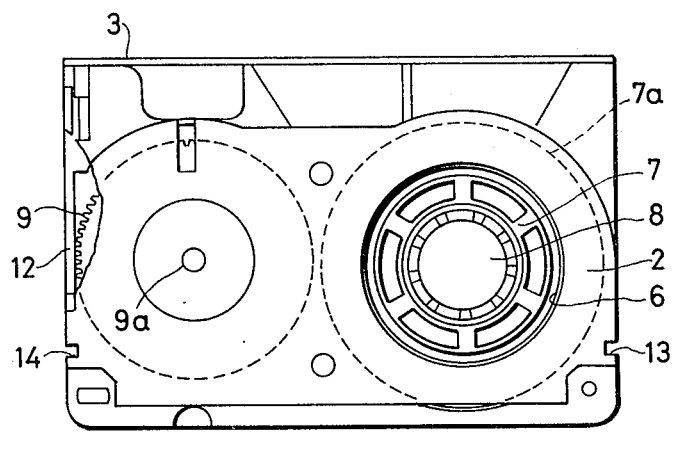
FIG. 1 is a bottom view of a cassette which can be contained in a storage case according to the present invention.
Figure 2:
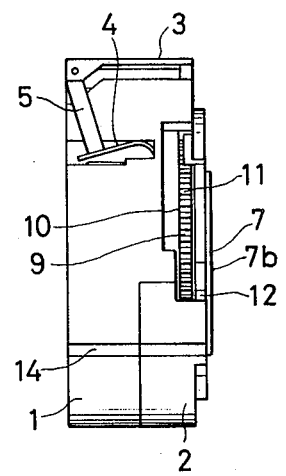
FIG. 2 is a side elevational view of the cassette shown in FIG. 1.

FIGS. 1 through 4 illustrate a video tape cassette, for example, which can be stored in a storage case constructed according to the present invention. The cassette comprises a package or container composed of a transparent upper half 1, an opaque lower half 2 affixed thereto, and a transparent front cover or lid 3 pivotably mounted on the upper half front lid 3 is angularly movable between open and closed positions (shown as fully closed). Front lid 3 can be latched in the open or closed position as desired but a retainer mechanism comprising, as shown in FIG. 2, a U-shaped spring 4 mounted in upper half 1 and a slide bar 5 fixed to front lid 3 and having an end held in slidable contact with the U-shaped spring.

As illustrated in FIG. 1, lower half 2 has a circular opening 6 for insertion therein of a supply reel disc (not shown) of a recorder-reproducer. The cassette includes a supply reel 7 disposed in coaxial relation to circular opening 6 and a circular flange 7a larger in diameter than circular opening 6 and a circular hole 8 in which the supply reel disc of the recorder-reproducer can be fitted. Supply reel 7 is normally pressed by a resilient means (not shown) attached to upper half 1 against the lower half so that supply reel 7 will be prevented from rotating freely when not in use. When the cassette is set in the recorder-reproducer, the supply reel disc thereof fits into hole 8 in supply reel 7 and raises the latter off lower half 2 toward the upper half 1 against the resiliency of the resilient means to thereby unlock the supply reel. Rotation of the supply reel disc causes supply reel 7 to be driven to reel out a magnetic tape wound thereon.

A takeup reel 9 is rotatably mounted on a shaft 9a fixed to lower half 2 and is disposed in the cassette in juxtaposed relation to supply reel 7. Takeup reel 9 includes a lower flange 10 having a series of circumferential teeth 11 which can mesh with a gear (not shown) drivable directly by a takeup reel disc (not shown) of the recorder-reproducer. As shown in FIG. 1, lower half 2 has a recess 12 through which teeth 9 on takeup reel flange 10 are exposed for driven mesh with the gear driven by the takeup reel disc. Takeup reel 9 is also urged by a resilient means (not shown) against lower half 2.

In FIG. 2, supply reel 7 has an end face 7b which, when the cassette is not loaded in the recorder-reproducer, projects outwardly beyond a bottom surface of lower half 2 under the force of the resilient means acting on the supply reel.

Figure 3:
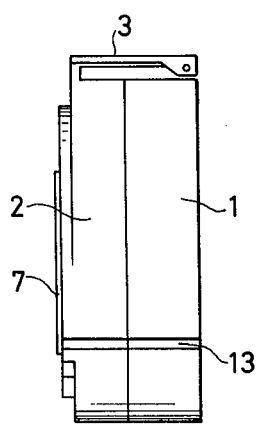
FIG. 3 is another side elevational view of the cassette.
Figure 4:
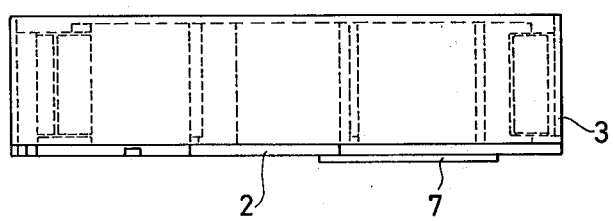
FIG. 4 is a front elevational view of the cassette.

A pair of transverse slots 13, 14 are defined respectively in sidewalls of the upper and lower halves 1, 2 remote from front lid 3, as shown in FIGS. 1 through 3.

To record or play back, the above described cassette is first loaded into the recorder-reproducer directly when the latter is designed for use with this type of cassette, or with an adapter when the recorder-reproducer is of another design. When a switch is turned on for recording or playback mode, supply reel 7 driven by the supply reel disc rotates in a direction to feed out magnetic tape. Takeup reel 9 is driven by the takeup reel disc through the drive gear meshing with teeth 11 to wind up the magnetic tape which has travelled from the supply reel 7 along a given path for recording or reproducing audio and video information.

FIGS. 5 through 10 show a storage case according to the present invention for use with the cassette designed as shown in FIGS. 1 through 4.

The storage case includes a base comprising a bottom 30, a rear wall 31 extending upwardly from a rear edge of the bottom 30, and a pair of parallel spaced side walls 32, 33 extending from the rear wall toward the front edge of the bottom. side walls 32, 33 have front portions cut away to provide tapered recesses 32a, 33a, respectively, opening toward the front edge of the bottom 30. The bottom 30 has a cylindrical projection 34 extending upwardly and located closer to side wall 33 than side wall 32. More specifically, cylindrical projection 34 is positioned such that, when the cassette is placed in the storage case in its proper position with front lid 3 facing rear wall 31 and with lower half 2 lying on bottom 30, cylindrical projection 34 is inserted in hole 8 in supply reel 7 of the cassette to position the latter against wobbling movement within the storage case. A plurality of vertical walls or locking fins 35 (three in the illustrated embodiment) are attached to the circumferential wall of cylindrical projection 34 and are spaced equally relative to each other, each fin having a tapered upper end. When cylindrical projection 34 is received in hole 8 in supply reel 7, fins 35 are fitted in grooves defined in an inner wall which bounds hole 8 to lock the supply reel 7 against accidental rotation about the cylindrical projection.

Cylindrical projection 34 has a height smaller than the depth of the hole 8. With the cassette stored in the storage case, therefore, supply reel 7 will not be raised by cylindrical projection 34 off the lower half 2 toward upper half 1. Bottom 30 includes a continuous track-shaped ridge 36 extending longitudinally and substantially fully between side walls 32, 33 and having a height much smaller than that of cylindrical projection 34. When the cassette is placed on bottom 30, ridge 36 allows lower face 7a of supply reel 7 to remain spaced upwardly out of contact with an upper surface of the bottom. Therefore, supply reel 7 rests on lower half 2 under the resiliency of the resilient means as long as the cassette remains in the storage case.

Each of side walls 32, 33 has a front end cut off, and hence is of a stepped configuration in its entirety. The side wall 32 has on its outer surface a pivot pin 37 adjacent rear wall 31 and a substantially semispherical locking protrusion 38. Side wall 32 also has on its inner surface a vertical ridge 39 located adjacent the front end thereof and a pair of vertical ridges 40, 41 (FIG. 7) positioned adacent tapered recess 32a to serve as a takeup reel stopper as described later on. Likewise, side wall 33 has on its outer surface a pivot pin (not shown) adjacent rear wall 31 and a substantially semispherical locking protrusion (not shown), and on its inner surface a vertical ridge 42 located adjacent the front end thereof. Vertical ridges 39, 42 are aligned with each other in opposing relation across bottom 30. When the cassette is placed in storage case in its proper disposition, vertical ridges 39, 42 are fit respectively in slots 14, 13, and vertical ridges 40, 41 are brought in locking mesh with teeth 11 on flange 10 of takeup reel 9 exposed through recess 12 in lower half 2 of the cassette.

As illustrated in FIG. 8, bottom 30 has on its lower surface a knurled or ridged portion 43 to ensure a firm grip against slippage when the storage case is gripped by fingers.

The base of the cassette storage case is molded from opaque material such for example as ABS resins.

The storage case also includes a cover comprising a top 50, a front wall 51 extending downwardly from a front edge of the top, and a pair of side walls 52, 53 extending from front wall 51 to a rear edge of the top. Side walls 52, 53 have apertures, respectively, in which pivot pins 37 on side walls 32, 33 of the base are received, respectively. Therefore, the cover is pivotably movable about pivot pins 37 between an open position as shown in FIG. 5 and a closed position as shown in FIGS. 6 and 7. Side walls 52, 53 also have cavities 54, 55, respectively, to receive semispherical protrusions 38 on side walls 32, 33 to lock the cover with respect to the base when the cover is in the fully closed position. When the cover is substantially halfway between the open and closed positions with no external force applied to cover, the semispherical protrusions 38 engage lower edges of side walls 52, 53 of the cover to allow the latter to remain partially open. With the cover in the partially open position, the cassette can still be stored into the storage case, or the storage case may be presented for display with the cassette put in.

As best shown in FIG. 6, front wall 51 has a shallow recess 56 in its central lower portion. The cover can easily be opened when the user pulls the cover up with a finger inserted in shallow recess 56.

The cover is molded from transparent material such as PMMA resins.

Pivot pins 37 on the side walls 32, 33 and apertures in side walls 52, 53 which receive the pivot pins are located such that when the cover as attached to the base is in the fully open position (FIG. 5), the rear edge of the cover is held against the lower edge of rear wall 31 of the base and the cover extends obliquely rearward. When the cover is thus fully open, the cassette storage case can stably be placed on a flat surface with the cover retracted back to provide a wide opening large enough to facilitate storage or removal of the cassette into or from the storage case.

With the storage case thus constructed, since cylindrical projection 34 is provided for engagement with only supply reel 7 of the cassette, there is no danger for the cassette to be inadvertently placed into the storage case with the front lid 3 head on, and hence the cassette can be properly placed in the storage case at all times without error. In the proper position of the cassette within the storage case, front lid 3 faces rear wall 31 of the base, with the result that the magnetic tape will safely be protected against any tendency to accidentally be pulled out of the cassette even when the cover of the storage case is left partially open.

When the cassette is stored in the storage case, supply reel 7 is locked in position by the cylindrical projection 34 against external forces tending to move the supply reel when the loaded storage case is handled roughly. Supply reel 7 is held against the lower half 2 under force of the resilient means against rotation and loosening of the magnetic tape. Supply reel 7 is also prevented from accidental rotation by fins 35 fitted in grooves in the inner wall of hole 8 in supply reel 7. As a result the magnetic tape will not loosen off the supply reel. Accordingly, there is no risk whatsoever of supply reel 7 rotating to reel out magnetic tape as long as the cassette is properly placed in the storage case. The tapered upper ends of the vertical fins 35 facilitate smooth insertion thereof into hole 8.

With the cassette is stored in the storage case, track-shaped ridge 36 on bottom 30 of the base serves to lift lower face 7a of supply reel 7 off the upper surface of the bottom. Thus, supply reel 7 remains urged against lower half 2 under the bias of the resilient means for protection against accidental rotation as described above. Such an arrangement permits the resilient means acting on supply reel 7 to be effective for a prolonged period of time as there is no undue force imposed to counteract the resiliency of the resilient means.

The transparent cover allows the user to see a label or other signs on an upper or rear surface of the cassette as placed in the storage case. The user therefore finds it quite easy to arrange a number of storage cases according to cassettes contained therein.

Figure 10:
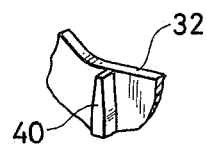
FIG. 10 is an enlarged fragmentary perspective view of a takeup reel stopper.

Vertical ridges 40, 41 serve as a takeup reel stopper when they mesh with teeth 11 on takeup reel flange 10. Takeup reel 9 is thus prevented from accidental rotation and the magnetic tape thereon is protected against loosening once the cassette is placed in the storage case. As shown in FIG. 10, each of the vertical ridges has its upper end tapered to permit them to mesh smoothly with teeth 11 on takeup reel flange 10, resulting in smooth operation to put the cassette into the storage case.

Since the base of the storage case has no front wall and side walls 32, 33 have the recesses 32a, 33a, respectively, the cassette can smoothly and easily be placed into or removed from the storage case with the cassette supported by the user at its opposite sides across the rear end. As there is no front wall, the storage case is made of a minimum number of parts, and hence can be constructed inexpensively. The cassette can also be taken into or out of the storage case even when the cover of the storage case is partially open. Therefore, the cassette can be put into or out of the storage case in a front-and-back direction when the cover is half open, or in a vertical direction when the cover is fully open. When the cassette is to be placed into the storage case in a front-and-back direction, the cassette is advanced over and across bottom 30 until front lid 3 abuts against rear wall 31 of the storage case. The cassette is then lowered onto bottom 30, an operation which is quite simple and smooth.

The vertical ridges 39, 40, which serve as elements for positionally locking the cassette as stored in the storage case, have a height smaller than that of rear wall 31. This dimensional limitation of vertical ridges 39, 40 enables the latter to smoothly enter cassette slots 14, 13, respectively, ridges initially engage these slots after the cassette has substantially been positioned with respect to the storage case by the rear wall 31 and the side walls 32, 33 thereof. With vertical ridges 39, 40 disposed near the front edge of the base of the storage case, the cassette as placed in the storage case can effectively be locked in position therein by the rear wall 31 and the vertical ridges 39, 40 spaced therefrom.

Figure 11:
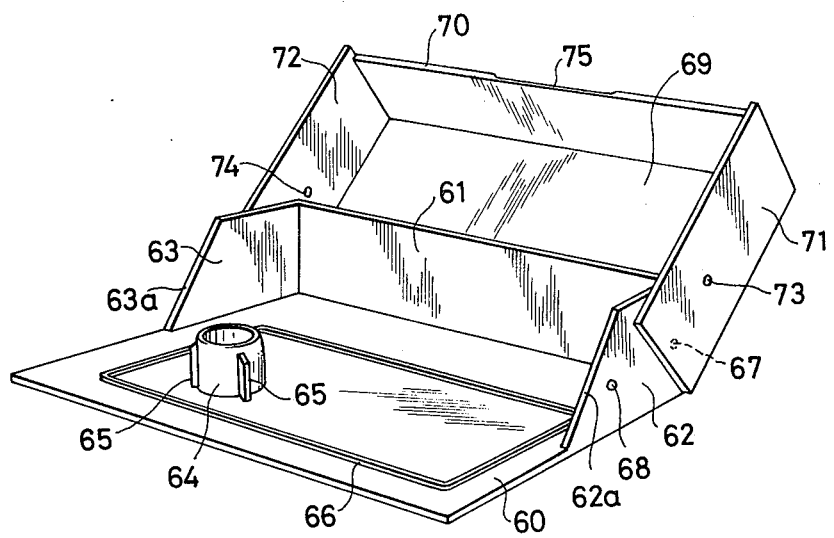
FIG. 11 is a perspective view of a storage case in accordance with another embodiment of the present invention.

FIG. 11 is illustrative of a cassette storage case according to another embodiment of the present invention. The storage case comprises a base including a bottom 60, a rear wall 61 extending upwardly from a rear edge of the bottom 60, and a pair of side walls 62, 63 spaced from each other and extending from the rear wall 61 toward a front edge of the bottom 60, there being a cylindrical projection 64 extending upwardly from the bottom 60 and having a plurality of angularly spaced vertical fins 65 on an outer circumferential wall of the cylindrical projection 64. The bottom 60 has a rectangular ridge 66 surrounding the cylindrical projection 64. The side walls 62, 63 have slanted edges 62a, 63a, respectively, positioned substantially midway between the front and rear edges of the bottom 60. The side walls 62, 63 also have respective pivot pins 67 (only one shown) disposed adjacent to the rear wall 61 and respective substantially semispherical protrusions 68 (only one shown) located near the slanted edges 62a, 63a, respectively. The storage case also includes a pivotably movable cover having a top 69, a front wall 70 extending downwardly from a front edge of the top 69, and a pair of side walls 71, 72 attached to opposite ends of the top 69 and the front wall 70. The side walls 71, 72 have a pair of apertures fitted over the pivot pins 67, respectively, to allow the cover to be pivotably movable between open and closed positions, and a pair of cavities 73, 74, respectively, which can fit over the semispherical protrusions 68 to lock the cover in its closed position. The front wall 70 has a shallow recess 75 for the user to put a finger in when pulling up the cover from the closed position to the open position.

The storage case illustrated in FIG. 11 is substantially the same in structure and operation except that the side walls 62, 63 terminate short of the front edge of the bottom 60 substantially intermediate between the front and rear edges of the bottom 60, there are no vertical walls on the side walls 62, 63 for lockingly engaging the side walls and the teeth on the takeup reel flange of the cassette, and the ridge 66 is of a rectangular shape.

Figure 12:
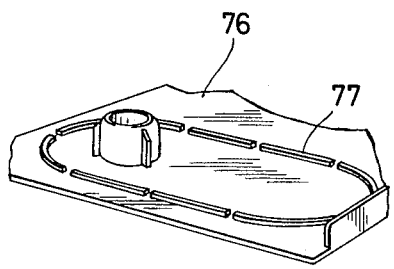
FIG. 12 is a fragmentary perspective view of a storage case according to a modification.

According to a modification shown in FIG. 12, a bottom 76 of a storage case base has thereon a series of discrete or interrupted ridge members 77 which assume a track-shaped configuration as a whole.

Although certain preferred embodiments of the present invention have been shown and described in detail, it should be understood that various changes and modifications may be made therein without departing from the scope of the appended claims.

What is claimed is:

1. A storage case for a cassette having a container including a front lid and a pair of juxtaposed supply and takeup reels housed in the container and having teeth defined on a flange of the takeup reel and partly exposed through a recess in the container, the supply reel having a hole for receiving a supply reel disc of a recorder-reproducer, said storage case comprising:
a base including a bottom having front and rear edges, a rear wall extending from said rear edge of the bottom, and a pair of spaced side walls extending from said rear wall toward said front edge of the bottom, said base having at least one stopper for engaging the teeth on the takeup reel flange to prevent the takeup reel from rotating when the cassette is placed in the storage case;
a sole projection mounted on said bottom for being inserted into the hole in the cassette supply reel to position the supply reel when the latter is placed in the storage case with the front lid facing said rear wall; and
a cover including a top having front and rear edges, a front wall extending from said front edge of the top, and a pair of spaced wide walls extending from said front wall toward said rear edge of the top, said side walls of said cover being pivotably mounted on said side walls of said base to allow said cover to be angularly movable between open and closed positions with respect to said base.

2. A storage case according to claim 1, for a cassette having grooves in an inner wall defining the hole in the supply reel, wherein said projection is cylindrical in shape and has a plurality of angularly spaced fins insertable into the grooves when the cassette is placed in the storage case.

3. A storage case according to claim 2, wherein each of said fins having a tapered end remote from said bottom of the base.

4. A storage case according to claim 1, wherein at least said top and front wall of said cover are transparent.

5. A storage case according to claim 1, wherein said projection on said bottom is located closer to one of said side walls of said base than to the other, said stopper being mounted on said other side wall of said base and having a tapered end remote from said bottom of said base for smooth engagement with the teeth on the takeup reel flange.

6. A storage case for a cassette having a container including a front lid and a pair of juxtaposed supply and takeup reels housed in the container, the supply reel having a hole for receiving a supply reel disc of a recorder-reproducer, said storage case comprising:
a base including a bottom having front and rear edges, a rear wall extending from said rear edge of the bottom, and a pair of spaced side walls extending from said rear wall toward said front edge of the bottom, wherein said side walls of said base terminate short of said front edge of the bottom substantially midway between said front and rear edges of said bottom;
a sole projection mounted on said bottom for being inserted into the hole in the supply reel of the cassette to position the supply reel when the latter is placed in the storage case with the front lid facing said rear wall; and
a cover including a top having front and rear edges, a front wall extending from said dront edge of the top, and a pair of spaced side walls extending from said front wall toward said rear edge of the top, said side walls of said cover being pivotably mounted on side walls of said base to allow said cover to be angularly movable between open and closed positions with respect to said base.

7. A storage case for a cassette having a container including a front lid and a pair of juxtaposed supply and takeup reels housed in the container and having a lower face of the supply reel projecting resiliently beyond a sole lower surface of the container, the supply reel having a hole for receiving a supply reel disc of a recorder-reproducer, said storage case comprising:
a base including a bottom having front and rear edges, a rear wall extending from said rear edge of the bottom, and a pair of spaced walls extending from said rear wall toward said front edge of the bottom, wherein said bottom has a ridge for engaging the container of the cassette to prevent the lower face of the supply reel from abuttin against said bottom when the cassette is placed in the storage case;
a sole projection mounted on said bottom for being inserted into the hole in the supply reel of the cassette to position the supply reel when the latter is placed in the storage case with the front lid facing said rear wall; and
a cover including a top having front and rear edges, a front wall extending from said front edge of the top, and a pair of spaced side walls extending from said front wall toward said rear edge of the top, said side walls of said cover being pivotably mounted on said side walls of said base to allow said cover to be angularly movable between open and closed positions with respect to said base.

8. A storage case according to claim 7, wherein said ridge is of a continuous configuration surrounding said projection mounted on said bottom and extending substantially fully between said side walls of the base.

9. A storage case according to claim 8, wherein said ridge is substantially track-shaped.

10. A storage case according to claim 8, wherein said ridge is substantially rectangular in shape.

11. A storage case according to claim 7, wherein said ridge is composed of a plurality of discrete ridge members which assume the shape of a track as a whole.

12. A storage case according to claim 1, wherein said ridge has a height smaller than that of said projection on said bottom.

13. A storage case for a cassette having a container including a front lid, a pair of juxtaposed supply and takeup reels housed in the container and a pair of opposite slots in the container, the supply reel having a hole for receiving a supply reel disc of a recorder-reproducer, said storage case comprising:
a base including a bottom having front and rear edges, a rear wall extending from said rear edge of the bottom, and a pair of spaced side walls extending from said rear wall toward said front edge of the bottom, wherein said base has a pair of ridges insertable respectively in the slots in the container for positionally locking the cassette in the storage case when the cassette is placed in the storage case, said ridges having a height smaller than that of said rear wall and side walls of said base;

a sole projection mounted on said bottom for being inserted into the hole in the supply reel of the cassette to position the supply reel when the latter is placed in the storage case with the front lid facing said rear wall; and a cover including a top having front and rear edges, a front wall extending from said front edge of the top, and side walls of said cover being pivotably mounted on said side walls of said base to allow said cover to be angularly movable between open and closed positions with respect to said base.

14. A storage case according to claim 13, wherein said ridges are mounted respectively on said side walls of said base in alignment with each other.

15. A storage case according to claim 13, wherein said ridges have a height smaller than that of said projection on said bottom.

16. A storage case for a cassette having a container including a front lid and a pair of juxtaposed supply and takeup reels housed in the container, the supply reel having a hole for receiving a supply reel disc of a recorder-reproducer, said storage case comprising:

a base including a bottom having front and rear edges, a rear wall extending from said rear edge of the bottom, and a pair of spaced side walls extending from said rear wall toward said front edge of the bottom;

a sole projection mounted on said bottom for being inserted into the hole in the supply reel of the cassette to position the supply reel when the latter is placed in the storage case with teh front lid facing said rear wall; and a cover including a top having front and rear edges, a front wall extending from said front edge of the top, and a pair of spaced side walls extending from said front wall toward said rear edge of the top, said side walls of said cover being pivotably mounted on said side walls of said base to allow said cover to be angularly movable between open and closed positions with respect to said base.

17. A storage case according to claim 16, wherein said sole projection on said bottom is located closer to one of said side walls of said base than to the other, said base being substantially flat between said sole projection and said other side wall.

* * * * *